(12) United States Patent
Hinz et al.

(10) Patent No.: US 9,114,836 B1
(45) Date of Patent: Aug. 25, 2015

(54) VEHICLE ROOF STRUCTURE

(71) Applicant: Honda Motor Co., Ltd., Tokyo (JP)

(72) Inventors: Christopher Hinz, Dublin, OH (US); Masahiro Ishikawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 14/174,103

(22) Filed: Feb. 6, 2014

(51) Int. Cl.
*B62D 25/06* (2006.01)
*B62D 27/04* (2006.01)

(52) U.S. Cl.
CPC ............... *B62D 25/06* (2013.01); *B62D 27/04* (2013.01)

(58) Field of Classification Search
CPC ........ B62D 25/06; B62D 25/02; B62D 27/04; B62D 29/008
USPC ..................................... 296/210, 213, 203.03
See application file for complete search history.

(56) References Cited

U.S. PATENT DOCUMENTS

| | | | |
|---|---|---|---|
| 5,018,781 | A | 5/1991 | Kumasaka et al. |
| 6,347,829 | B1 | 2/2002 | Hanyu |
| 6,676,203 | B2 | 1/2004 | Lumpe et al. |
| 7,182,381 | B2 | 2/2007 | Ogawa et al. |
| 7,377,581 | B2 | 5/2008 | Barutzky et al. |
| 8,123,286 | B2 | 2/2012 | Furusako et al. |
| 2005/0104418 | A1 | 5/2005 | Zirbs |
| 2012/0061998 | A1 | 3/2012 | Carsley et al. |

FOREIGN PATENT DOCUMENTS

| | | | | |
|---|---|---|---|---|
| DE | 19746165 | | 4/1999 | |
| DE | 19939977 | | 3/2001 | |
| DE | 19939978 | * | 3/2001 | ............. B62D 25/06 |
| DE | 102004019818 | * | 12/2005 | ............. B62D 25/06 |
| EP | 1580102 | | 9/2005 | |
| JP | 2000272541 | | 10/2000 | |
| JP | 2003341547 | | 12/2003 | |
| JP | 2010083246 | | 4/2010 | |
| JP | 2011073569 | | 4/2011 | |

* cited by examiner

*Primary Examiner* — Dennis H Pedder
(74) *Attorney, Agent, or Firm* — Rankin, Hill & Clark LLP (57) ABSTRACT

A vehicle assembly includes a roof structure having a roof panel formed of aluminum or an aluminum-based alloy and a vehicle body formed of steel or a steel alloy supporting the roof structure. The vehicle body includes a pair of laterally spaced side panels, a front roof rail and a rear roof rail. A bracket formed of steel or a steel alloy secures the roof structure to the vehicle body. The bracket has a first portion fastened to the roof panel and a second portion extending away from the roof structure and welded to the vehicle body. An adhesive located inward of the connection of the vehicle body and second portion of the bracket bonds the second portion to the vehicle body. The adhesive seals the connection of the roof panel and bracket first portion and reduces thermal distortion of the attached roof panel relative to the vehicle body.

20 Claims, 4 Drawing Sheets

VEHICLE ROOF STRUCTURE

BACKGROUND

The substitution of aluminum or aluminum-based alloy roof panels for the low-carbon steel or steel alloy roof panels most commonly used in motor vehicles is an attractive option for vehicle mass reduction. Often, however, the remainder of the vehicle body structure continues to be fabricated of steel. Joining an aluminum roof panel to a steel body panel is difficult due to the thermal expansion considerations of the dissimilar materials. The combination of the aluminum roof panel attached to the steel body may create compressive stresses in the aluminum roof panel when the body is subjected to elevated temperatures such as those required to cure or bake the paint applied to the body. These stresses may lead to unacceptable appearance features in the visible segment of the roof panel.

Manufacturers currently secure the aluminum roof panel to the steel body panel after the weld process in assembly. This process typically includes an adhesive bonding operation. Self-piercing rivets can also be used to secure the aluminum roof panel to the steel body panel. This approach, though appealing from a vehicle mass-reduction viewpoint, raises issues due to the significantly different coefficients of thermal expansion of aluminum and steel (about $22.5 \times 10^{-6}$ m/m K for aluminum and about $13 \times 10^{-6}$ m/m K for steel). The adhesive must be able to absorb the distortion caused by the thermal expansion difference between the roof panel and the steel body panel. Further, because the steel and aluminum are permanently joined together by the rivets, this difference in thermal expansion of steel and aluminum will develop stresses in the aluminum and steel whenever the vehicle body temperature differs from the temperature at which the joint was made. The highest temperature experienced by the vehicle body is during manufacture, when the assembled body is painted. Automotive paint consists of a number of layers, applied separately and then cured at an elevated temperature. The paint is cured by passing the painted body through one or more paint bake ovens to raise the body temperature to about 180-200° C. and maintain it at that temperature for at least 20 minutes. This elevated temperature may be sufficient to initiate plastic deformation in the aluminum roof panel. Since plastic deformation is not reversed on cooling, any such deformation may result in an appearance feature such as a crease or buckle in the roof panel which could be unacceptable to the customer.

Further, having the roof and vehicle body panels in contact or electrically connected can create galvanic corrosion. The risk for this corrosion is increased when water is present, such as in the roof gutter areas. As it relates to the adhesive, the current joining process uses the paint bake ovens to cure the adhesive bonding the aluminum roof panel to the steel body panel. However, the heat from the paint bake ovens can cause distortion of the aluminum roof panel relative to the steel body, creating a bowing effect. If left unconstrained, the roof panel would bow enough to break the adhesive bond between the roof panel and vehicle body.

BRIEF DESCRIPTION

In accordance with one aspect, a vehicle assembly comprises a roof structure including a roof panel formed of aluminum or an aluminum-based alloy and a vehicle body supporting the roof structure and formed of steel or a steel alloy. The vehicle body includes a pair of laterally spaced side panels, a front roof rail and a rear roof rail. Each roof rail spans between the side panels. At least one bracket secures the roof structure to the vehicle body. The bracket has a first portion fastened to the roof panel and a second portion extending away from the roof structure and welded to the vehicle body. The bracket is formed of steel or a steel alloy. An adhesive located inward of the weld connection of the vehicle body and second portion of the bracket bonds the second portion to the vehicle body. The adhesive seals the fastened connection of the roof panel and first portion of the bracket from moisture to prevent galvanic corrosion between the dissimilar materials of the roof panel and bracket. The adhesive further reduces thermal distortion of the attached roof panel relative to the vehicle body when the vehicle assembly is heated in a paint bake oven during the manufacture of the vehicle assembly.

In accordance with another aspect, a vehicle assembly comprises a vehicle roof structure including a roof panel and a vehicle body. The vehicle roof structure is formed of aluminum or an aluminum-based alloy. The vehicle body includes a pair of laterally spaced side panels and a front roof rail and a rear roof rail spanning between the side panels. The side panels together with the front and rear roof rails support the vehicle roof structure. The vehicle body is formed of steel or a steel alloy. A pair of side brackets connects the side panels to roof panel, a front bracket connects the front roof rail to the roof panel, and a rear bracket connects the rear roof rail to the roof panel. Each bracket has a first portion fastened to the roof panel and a second portion extending outwardly of the roof panel and welded to the vehicle body. Each bracket is formed of steel of a steel alloy. The vehicle roof structure is bonded to the vehicle body via an adhesive. Each of the brackets provides a continuous vertical spacing between the roof panel and the vehicle body of approximately 4 mm to approximately 6 mm, and the adhesive is provided in the spacing. The adhesive seals the fastened connection of the roof panel and first portion of the bracket from moisture to prevent galvanic corrosion between the dissimilar materials of the roof panel and bracket. The adhesive further reduces thermal distortion of the attached roof panel relative to the vehicle body when the vehicle assembly is heated in a paint bake oven during the manufacture of the vehicle assembly.

In accordance with yet another aspect, a method of assembling a vehicle comprises providing a vehicle body formed of steel or a steel alloy, the vehicle body includes a pair of laterally spaced side panels, a front roof rail and a rear roof rail, each roof rail spans between the side panels; providing a vehicle roof structure formed of aluminum or an aluminum-based alloy, the vehicle roof structure includes a roof panel having a flange structure provided at a peripheral edge portion, the flange portion including a vertical wall and a horizontal surface; applying an adhesive on the horizontal surface of the flange structure around an entire perimeter of the roof panel; providing a pair of side brackets, a front bracket and a rear bracket, each bracket formed of steel or a steel alloy, and positioning each of the brackets on the flange structure such that the adhesive is between each bracket and the flange structure; positioning the vehicle roof structure together with the brackets on the vehicle body; fastening each of the brackets to the vertical wall of the flange structure; welding the side brackets to the side panels, the front bracket to the front roof rail and the rear bracket to the rear roof rail; and heating the vehicle body together with the vehicle roof structure and the brackets to a predetermined temperature to cure the adhesive.

DETAILED DESCRIPTION

It should be understood that the description and drawings herein are merely illustrative and that various modifications and changes can be made in the structures disclosed without departing from the present disclosure. In general, the figures of the exemplary vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle roof structure disclosed herein are merely terms of art that may vary from one manufacturer to another and should not be deemed to limit the present disclosure.

Figure 1:
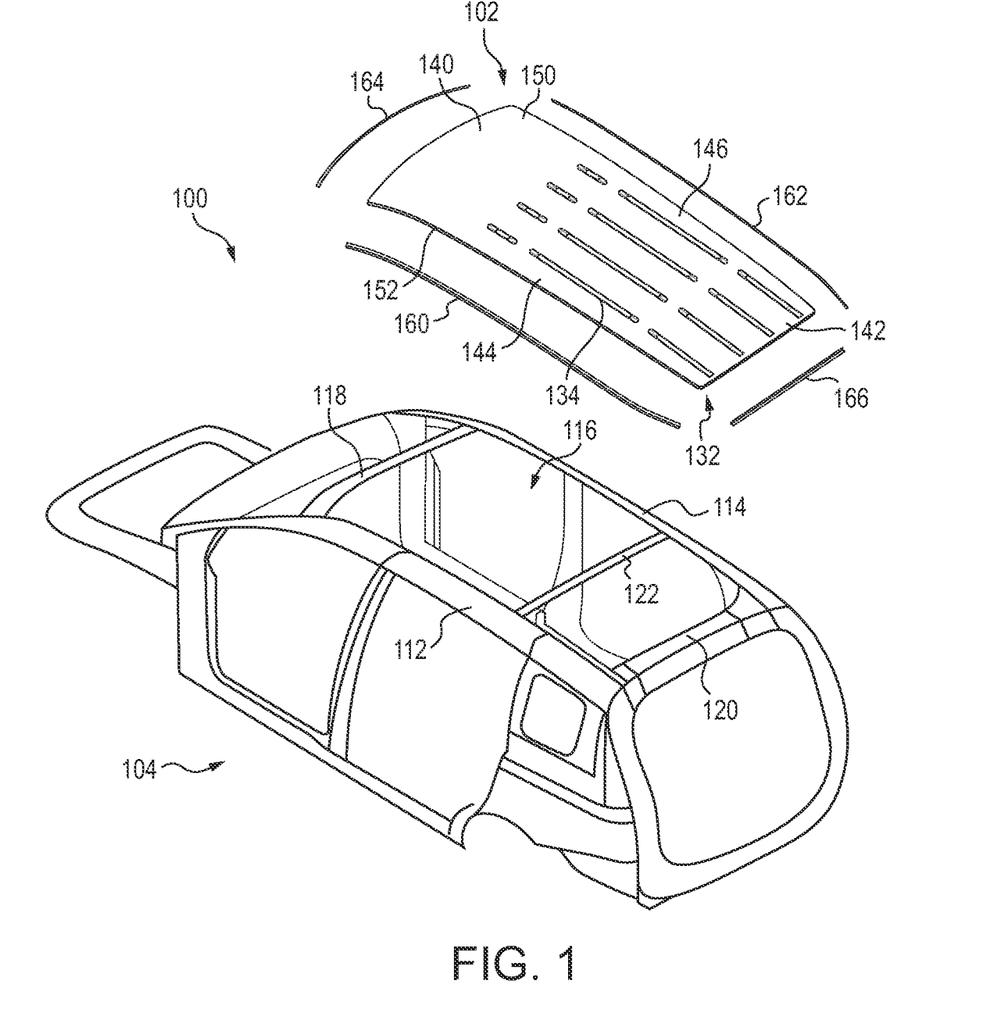
FIG. 1 is an exploded perspective view of a vehicle assembly including a vehicle body formed of steel or a steel alloy and a vehicle roof structure formed of aluminum or an aluminum-based alloy.

Increasingly, low-carbon steel or steel alloys, long the material of choice for vehicle body construction, is being displaced by higher strength-to-weight ratio materials such as aluminum or aluminum-based alloys. This trend is driven by a desire to reduce vehicle weight for improved fuel economy. An example of this is the exemplary vehicle assembly 100 which has an aluminum or aluminum-based alloy roof structure 102 attached to a steel or steel alloy vehicle body 104. As schematically shown in FIG. 1, the vehicle body 104 includes a pair of laterally spaced body members or side panels 112, 114 for defining sides of a passenger compartment 116 and a front roof rail 118 and a rear roof rail 120 spanning between the side panels. The body members 112, 114 may be identically constructed, but for their disposition on opposite sides of the vehicle assembly 100. At least one cross member or roof bow 122 can be interposed between the front and rear roof rails 118, 120 and extends between the spaced body members 112, 114. The side panels together with the front and rear roof rails 118, 120 support the roof structure 102 over the passenger compartment 116. Attached to the vehicle body 104 is the exemplary vehicle roof structure 102.

Figure 2:
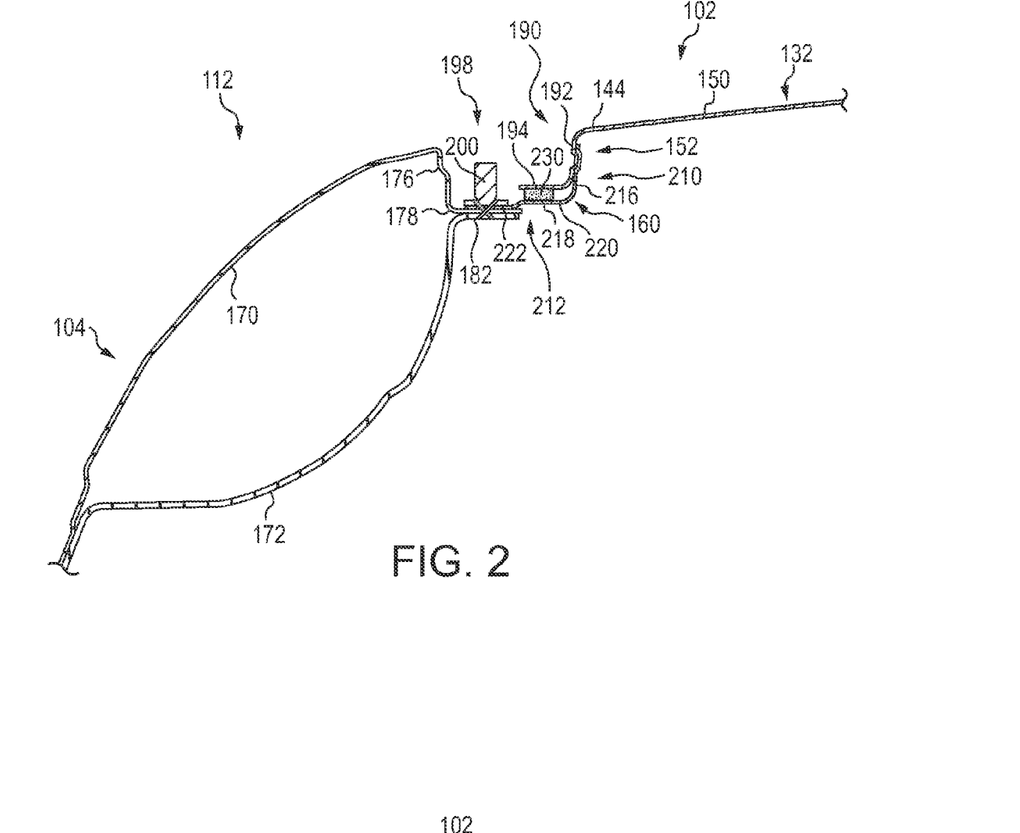
FIG. 2 is a cross-sectional view taken along a side portion of the vehicle assembly.

With reference to FIG. 2, the vehicle roof structure 102 includes an aluminum or aluminum-based alloy roof panel 132 which overlies the passenger compartment 116. The roof panel 132 can include stiffening ribs 134 adapted to accommodate loads imparted on the roof panel by articles transported thereon, for example in a luggage rack. These ribs are commonly used on vehicles such as SUVs or vans because the roof panels for these vehicles are extensive and generally flat. The ribs 134 stiffen the roof panel 132 and help it to maintain its shape. For roof panels used in smaller vehicles, such as sedans, these ribs are generally not required. The roof panel 132 is generally rectangular in plan view but because individual vehicle roof structures are required to conform to vehicle styling, the roof panel can have alternative shapes. The roof panel 132 includes a forward end portion 140, a rearward end portion 142 and opposite side portions 144, 146 which extend longitudinally between the forward and rearward end portions. The vehicle roof assembly 102 further includes at least one roof stiffener which extends between the side portions 144, 146. In the assembled condition of the vehicle assembly 100, a roof stiffener (not shown) can overlie the roof bow 122; although the roof stiffener is not required. As is well known, an opening (not shown) can be provided in the roof panel 132 for a sunroof assembly (not shown).

At least one bracket formed of steel or a steel alloy secures the roof structure 102 to the vehicle body 104. As will be described in greater detail below, the at least one bracket has a first portion fastened to the roof panel 132 and a second portion extending away from the roof structure 102 and welded to the vehicle body 104. The roof panel 132 includes an upper horizontal surface 150 connected to a flange structure 152 provided at a peripheral edge portion of the upper horizontal surface. According to one aspect, the flange structure 152 extends about the entire peripheral edge portion of the upper horizontal surface 150. The flange structure 152 is generally defined by a vertical wall and a lower horizontal surface (lower relative to the upper horizontal surface 150). The bracket first portion is fastened to the vertical wall and the bracket second portion is adhered or bonded to the lower horizontal surface.

Particularly, the at least one bracket includes a pair of side brackets 160, 162, a front bracket 164 and a rear bracket 166. The side brackets 160, 162 extend longitudinally on the roof panel 132 between the forward and rearward end portions 140, 142 of the roof panel 132 and connect the side panels 112, 114 to the respective side portions 144, 146 of the roof panel 132. The front bracket 164 extends laterally across the roof panel 132 between the side portions 144, 146 and connects the front roof rail 118 to the forward end portion 140 of the roof panel 132. The rear bracket 166 also extends laterally across the roof panel 132 between the side portions 144, 146 and connects the rear roof rail 120 to the rearward end portion 142 of the roof panel 132. Each bracket 160, 162, 164, 166 is separate from the roof panel 132 and is fixedly secured thereto to facilitate attachment of the roof panel and vehicle body 104. The brackets 160, 162, 164, 166 can be separate from each other or can be formed as a unitary-one piece member, such as a single frame. As shown in FIG. 1, together the four brackets 160, 162, 164, 166 extend approximately an entire perimeter of the roof panel 132.

FIG. 2 depicts the side panel 112 connected to the side portion 144 via the side bracket 160. To simplify the explanation of the present disclosure, only the construction of the side panel 112 and its connection to the vehicle roof structure 102 will be discussed, but it should be understood that the side panel 114 can have the same construction with a similar connection to the vehicle roof structure 102. The side panel 112 includes an outer panel 170 and an inner panel 172. As is well known, a reinforcement (not shown) can be interposed between the outer and inner panels. The outer panel 170 includes a flange structure having vertical wall 176 and a horizontal wall 178. The inner panel 172 also includes a flange structure having a horizontal wall 182. The respective horizontal walls 178, 182 of the outer panel 170 and inner panel 172 have complementary forms which nest and are welded together. The side portion 144 of the roof panel 132 includes a side section 190 of the peripheral flange structure 152 having a vertical wall 192 and a lower horizontal surface 194 (lower relative to the upper horizontal surface 150). It should be appreciated that the respective flange structures of the side panel 112 and roof panel 132 define a roof groove 198 having provided therein mounting studs 200 for the attachment of a roof molding (not shown). Each mounting stud 200 can be fixedly attached (e.g., welded) to the horizontal walls 178, 182 of the outer panel 170 and inner panel 172.

The side bracket 160 connects the side panel 112 to the side section 190 of the peripheral flange structure 152 of the roof panel side portion 144. The side bracket 160 includes a first portion 210 and a second portion 212. The first portion 210 is fastened to the vertical wall 192. The second portion 212 extends outwardly from the roof panel 132 a distance approximately equal to a distance or spacing between the outer panel 170 and the roof panel. This allows the second portion 212 to be both adhered or bonded to the lower horizontal surface 194 and fixedly attached (e.g., welded) to the horizontal wall 178 of the outer panel 170. As depicted in FIG. 2, the side bracket 160 is substantially L-shaped and the first portion 210 of the side bracket 160 is a vertical leg 216 and the second portion 212 is a horizontal leg 218. The vertical leg 216 is connected to an interior of the roof panel vertical wall 192 by any mechanical means known in the art, such as but not limited to the illustrated clinching of the vertical leg 216 to the vertical wall 192. For example, it should be appreciated that the vertical leg 216 can be welded to the vertical wall 192 or connected by use of self piercing rivets, bolts, etc. The horizontal leg 218 has a stepped configuration including an upper section 220 (i.e., a section closer to the upper horizontal surface 150 of the roof panel 132) and a lower section 222. The upper section 220 of the horizontal leg 218 is adhered or bonded to the lower horizontal surface 194 of the roof panel 132 via an electrically nonconductive adhesive 230. As such, the connection between the first portion 210 of the side bracket 160 and the vertical wall 192 of the roof panel 132 is positioned inwardly of the adhesive 230. The lower section 222 extends outward beyond an end of the lower horizontal surface 194 and is dimensioned approximately equal to a dimension of the horizontal wall 178 of the outer panel 170. This allows the lower section to be nested with and fixedly attached (e.g., welded) to the respective horizontal walls 178, 182 of the outer panel 170 and inner panel 172. The mounting stud 200 can be fixedly attached (e.g., welded) to the lower section 222.

Figure 3:
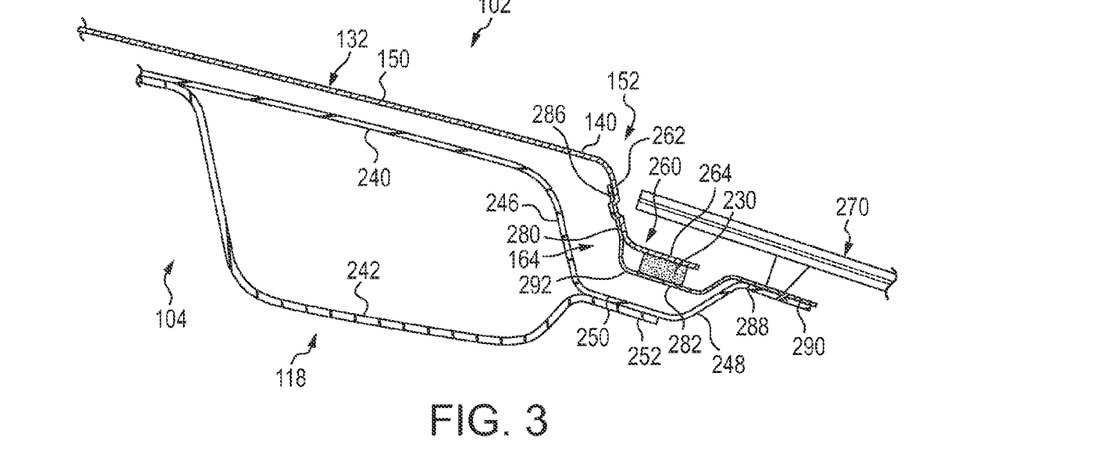
FIG. 3 is a cross-sectional view taken along a forward portion of the vehicle assembly.

FIG. 3 depicts the front roof rail 118 connected to the forward end portion 140 of the roof panel 132 via the front bracket 164. The front roof rail 118 includes an outer panel 240 and an inner panel 242. As is well known, a reinforcement (not shown) can be interposed between the outer and inner panels. The outer panel 240 includes a flange structure having vertical wall 246 and a horizontal wall 248. The horizontal wall 248 can have stepped configuration and includes a depressed section 250 extending from the vertical wall 246. The inner panel 242 also includes a flange structure having a horizontal wall 152. The depressed section 250 of the outer panel horizontal wall 248 is fixedly attached (e.g., welded) to the inner panel horizontal wall 252. The forward end portion 140 of the roof panel 132 includes a forward section 260 of the peripheral flange structure 152 having a vertical wall 262 and a lower horizontal surface 264 (lower relative to the upper horizontal surface 150). The lower horizontal surface 264 extends beneath an end portion of a windshield 270 mounted to the vehicle body 104.

The front bracket 164 connects the front roof rail 118 to the forward section 260 of the peripheral flange structure 152 of the roof panel forward end portion 140. The front bracket 164 includes a first portion 280 and a second portion 282. The first portion 280 is fastened to the vertical wall 262. The second portion 282 extends outwardly from the roof panel 132 a distance approximately equal to a distance the horizontal wall 248 of the outer panel 240 extends outwardly from the roof panel 132. This allows the second portion 282 to be both adhered or bonded to the lower horizontal surface 264 and fixedly attached (e.g., welded) to the horizontal wall 248 of the outer panel 240. As depicted in FIG. 3, the front bracket 164 is substantially L-shaped and the first portion 280 of the front bracket 164 is a vertical leg 286 and the second portion 282 is a horizontal leg 288. The vertical leg 286 is connected to an interior of the roof panel vertical wall 262 by any mechanical means known in the art, such as but not limited to the illustrated clinching of the vertical leg 286 to the vertical wall 262. For example, it should be appreciated that the vertical leg 286 can be welded to the vertical wall 262 or connected by use of self piercing rivets, bolts, etc. The horizontal leg 288 has a stepped configuration including an upper section 290 (i.e., a section closer to the upper horizontal surface 150 of the roof panel 132) and a lower section 292. The lower section 292 of the horizontal leg 288 is aligned with the depressed section 250 and is adhered or bonded to the lower horizontal surface 264 of the roof panel 132 via the electrically nonconductive adhesive 230. This positions the connection between the first portion 280 of the front bracket 164 and the vertical wall 262 of the roof panel 132 inwardly of the adhesive 230. The upper section 290 extends outward beyond an end of the lower horizontal surface and is fixedly attached (e.g., welded) to the horizontal wall 248 of the outer panel 240. The end portion of the windshield 270 is adhesively bonded to the upper section 290 of the front bracket 164.

Figure 4:
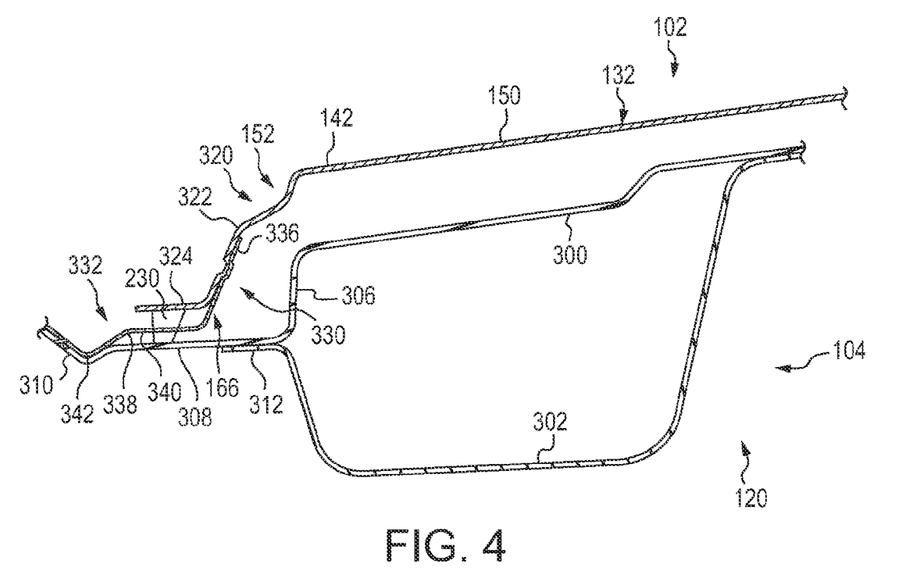
FIG. 4 is a cross-sectional view taken along a rearward portion of the vehicle assembly according to one aspect of the present disclosure.

FIG. 4 depicts the rear roof rail 120 connected to the rearward end portion 142 of the roof panel 132 via the rear bracket 166. The rear roof rail 120 includes an outer panel 300 and an inner panel 302. As is well known, a reinforcement (not shown) can be interposed between the outer and inner panels. The outer panel 300 includes a flange structure having vertical wall 306 and a horizontal wall 308. An end portion 310 of the horizontal wall 308 can be angled; although, this is not required. The inner panel 302 also includes a flange structure having a horizontal wall 312 which is fixedly attached (e.g., welded) to the outer panel horizontal wall 308. The rearward end portion 142 of the roof panel 132 includes a rearward section 320 of the peripheral flange structure 152 having a vertical wall 322 and a lower horizontal surface 324 (lower relative to the upper horizontal surface 150).

The rear bracket 166 connects the rear roof rail 120 to the rearward section 320 of the peripheral flange structure 152 of the roof panel rearward end portion 142. The rear bracket 166 includes a first portion 330 and a second portion 332. The first portion 330 is fastened to the vertical wall 322. According to one aspect shown in FIG. 4, the second portion 332 extends outwardly from the roof panel 132 a distance approximately equal to a distance the horizontal wall 308 of the outer panel 300 extends outwardly from the roof panel 132. The rear bracket 166 is substantially L-shaped and the first portion 330 of the rear bracket 166 is a vertical leg 336 and the second portion 332 is a horizontal leg 338. The vertical leg 336 is connected to an interior of the roof panel vertical wall 322 by any mechanical means known in the art, such as but not limited to the illustrated clinching of the vertical leg 336 to the vertical wall 332. For example, it should be appreciated that the vertical leg 336 can be welded to the vertical wall 322 or connected by use of self piercing rivets, bolts, etc. The horizontal leg 338 has a stepped configuration including an upper section 340 (i.e., a section closer to the upper horizontal surface 150 of the roof panel 132) and a lower section 342. The lower section 342 of the horizontal leg 338 can be angled to match the angled end portion 310 of the outer panel horizontal wall 308. According to the embodiment of FIG. 4, the upper section 340 is adhered or bonded to the lower horizontal surface 324 of the roof panel 132 via the electrically nonconductive adhesive 230. This positions the connection between the first portion 330 of the rear bracket 166 and the vertical wall 322 of the roof panel 132 inwardly of the adhesive 230. The lower section 342 extends outward beyond an end of the lower horizontal surface 324 and is fixedly attached (e.g., welded) to the end portion 310 of the horizontal wall 308 of the outer panel 300.

Figure 5:
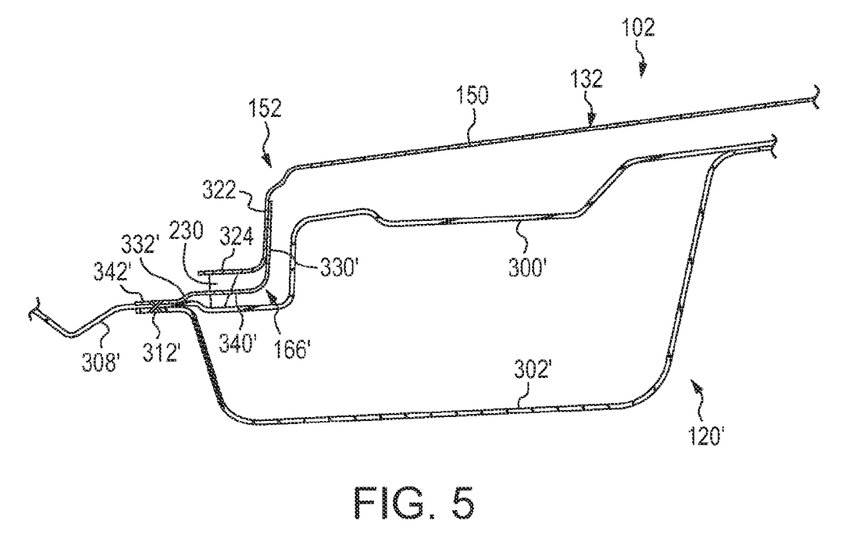
FIG. 5 is a cross-sectional view taken along a rearward portion of the vehicle assembly according to another aspect of the present disclosure.

FIG. 5 shows another aspect of a rear bracket 166' for connecting a rear roof rail 120' to the peripheral flange structure 152 of the roof panel 132. The rear bracket 166' includes a first portion 330' attached to the vertical wall 332 of the flange structure 152. A second portion 332' of the rear bracket 166' is shorter in length than a horizontal wall 308' of an outer panel 308' of the rear roof rail 120'. This allows a lower section 342' of the second portion 332' to be nested with and fixedly attached (e.g., welded) to the respective horizontal walls 308', 312' of the outer panel 300' and inner panel 302'. An upper section 340' of the second portion 332' is adhered or bonded to the lower horizontal surface 324 of the roof panel 132 via the electrically nonconductive adhesive 230.

It should be appreciated that the locations of the fastened connections (e.g., clinching) between the first portion 210, 280, 330 of each of the brackets 160, 162, 164, 166 and the roof panel 132 is generally dictated by the need for the strength of the attachment between the vehicle roof structure 102 and vehicle body 104 and more, closely-spaced, connections will promote stronger attachment. However, it should also be appreciated that distortion of the roof panel 132 can be minimized when fewer connections are employed, and the brackets 160, 162, 164, 166 together with the adhesive 230 provides the required attachment strength between the vehicle roof structure 102 and the vehicle body 104. In addition, each of the brackets 160, 162, 164, 166 maintains a continuous spacing or gap between the roof panel 132 of the vehicle roof structure 102 and the vehicle body 104 of approximately 4 mm to approximately 6 mm, and the adhesive 230 is provided in the spacing. As shown, this continuous spacing provided by brackets 160, 162, 164, 166 for the adhesive 230 is in the vertical or height direction between the roof panel 132 and the second portions 212, 282, 332 of the brackets 160, 162, 164, 166 which connect the roof panel 132 to the vehicle body 104. According to one aspect, the continuous vertical spacing between the roof panel 132 and the vehicle body 104 is approximately 5 mm. This continuous vertical spacing maintained between the vehicle roof structure 102 and vehicle body 104 eliminates the concern for galvanic corrosion and also controls the flow and location of the e-coat on the vehicle assembly 100. It should also be appreciated that with the connection of the first portion 210, 280, 330 of each respective bracket 160, 162, 164, 166 to the roof panel 132 being located inward of the adhesive 230, the adhesive 230 seals the connection of the roof panel 132 and each bracket from the intrusion of water/moisture and dirt debris to prevent galvanic corrosion between the dissimilar materials of the roof panel 132 and brackets 160, 162, 164, 166.

As indicated above, rigidly attaching the aluminum-based alloy vehicle roof structure 102 to the steel vehicle body 104 (i.e., vehicle components with dissimilar coefficients of thermal expansion—about $22.5 \times 10^{-6}$ m/m K for aluminum and about $13 \times 10^{-6}$ m/m K for steel) will generate thermal stresses when the temperature is raised or lowered. On heating, tensile stresses develop in the lower coefficient of thermal expansion material and compressive stresses develop in the material with the higher coefficient of thermal expansion. Thus, the roof panel 132 of the vehicle roof structure attached to the vehicle body 104 will be subjected to compressive thermal stresses with increase in temperature, the thermal stresses increasing generally in proportion to the temperature.

After assembly, but before attachment of closures such as doors or hoods, the vehicle assembly 100 is washed and then painted. The paint must be cured by exposure to elevated temperatures, requiring that the vehicle assembly 102 to pass through at least one paint bake oven, subjecting the vehicle assembly to temperatures of up to 200° C. for a period of not less than 20 minutes. This temperature establishes the greatest compressive stress developed in the vehicle roof structure. The roof panel 132, when subjected to compressive loads or stresses may deform, forming a buckle. If the buckling stress exceeds the yield stress of the metal of the roof panel, the buckle will be permanent and the roof panel 132 will not adopt its original configuration even after even after the vehicle assembly 100 exits the oven and cools.

Figure 6A:
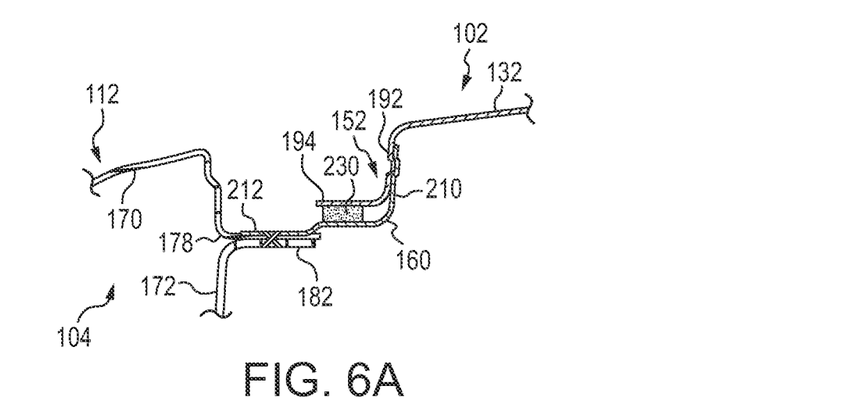
FIGS. 6A, 6B and 6C illustrate thermal distortion of the attached roof panel relative to the vehicle body when the vehicle assembly is heated in a paint bake oven during the manufacture of the vehicle assembly.
Figure 6B:
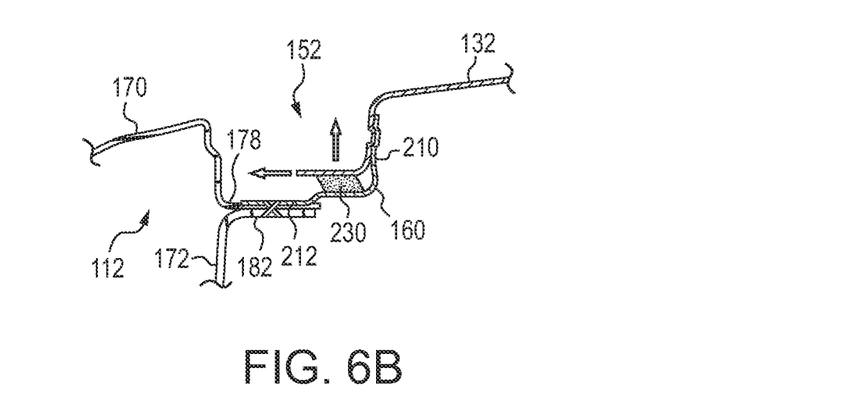
Figure 6C:
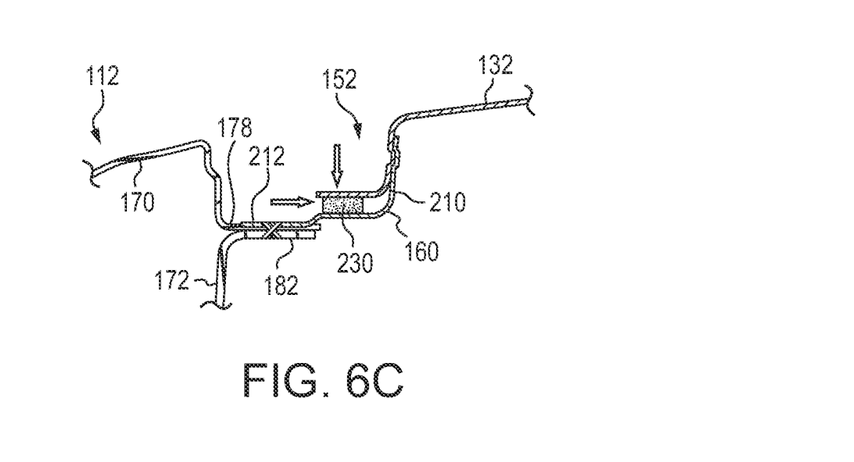

The brackets 160, 162, 164, 166 together with the adhesive 230 reduce thermal distortion of the attached roof panel 132 relative to the vehicle body 104 when the vehicle assembly 100 is heated in the paint bake oven during the manufacture of the vehicle assembly. By way of example, FIG. 6A shows a pre-bake condition of the vehicle assembly 100. FIG. 6B shows the vehicle assembly 100 in a baking condition. As the roof panel 132 expands upwardly and outwardly, the adhesive 230 absorbs the expansion. As shown in FIG. 6C, the roof panel 132 returns to the pre-bake condition. Thus, the continuous spacing or gap provided by the brackets 160, 162, 164, 166 for the adhesive 230 allows the aluminum roof panel 132 to distort during baking and curing of the adhesive (e.g., during an e-coat process) and allows shearing of the adhesive without the adhesive failing and without deformation of either the roof panel 132 or the side panel 112. Again, the adhesive 230 forms the primary connection between the second portions 212, 282, 332 of the brackets 160, 162, 164, 166 and the roof panel 132, whereas the fastened connection (e.g., clinching) of the first portions 210, 280, 330 of the brackets to the roof panel 132 is more for positioning the roof panel and the brackets together prior to curing of the adhesive 230. The adhesive 230 provides flexibility during heating of the vehicle body to help absorb the stress associated with the different expansion rates of the dissimilar materials. And the depicted fastened (e.g. clinched) area is in a dry section because the adhesive 230 seals the connection of the brackets 160, 162, 164, 166 and the roof panel 132 from moisture to prevent galvanic corrosion between the dissimilar materials.

As evident from the foregoing, to prevent distortion of the vehicle roof structure 102 as described above, the present disclosure provides a method of assembling a vehicle including the vehicle body 104 formed of steel or a steel alloy and the vehicle roof structure 100 formed of aluminum or an aluminum-based alloy. The method comprises providing the vehicle body 102 including the pair of laterally spaced side panels 112, 114, the front roof rail 118 and the rear roof rail 120; providing the vehicle roof structure 102 including the roof panel 132 having the flange structure 152 provided at a peripheral edge portion; applying the adhesive 230 on the horizontal surface 194, 264, 324 of the flange structure 152 around an entire perimeter of the roof panel 132; positioning each of the brackets 160, 162, 164, 166 on the flange structure 152 such that the adhesive 230 is between each bracket and the flange structure; positioning the vehicle roof structure 102 together with the brackets 160, 162, 164, 166 on the vehicle body 104; fastening each of the brackets 160, 162, 164, 166 to the vertical wall 192, 262, 322 of the flange structure 152 (e.g., by clinching, welding, fasteners); welding the side brackets 160, 162 to the side panels 112, 114, the front bracket 164 to the front roof rail 118 and the rear bracket 166 to the rear roof rail 120; and heating the vehicle body 104 together with the vehicle roof structure 102 and the brackets 160, 162, 164, 166 to a predetermined temperature to cure the adhesive 230.

The exemplary method further comprises providing a continuous vertical spacing between the roof panel 132 and the vehicle body 104 of approximately 4 mm to approximately 6 mm by use of the side brackets, front bracket and rear bracket, and providing the adhesive 230 in the spacing; positioning the fastened connection between the brackets 160, 162, 164, 166 and the flange structure 152 inwardly of the adhesive 230, and positioning the welded connection between the brackets 160, 162, 164, 166 and the vehicle body 104 outwardly of the adhesive 230. The method further includes clinching the respective vertical leg 216, 286 336 of each bracket 160, 162, 164, 166 to an interior of the flange structure vertical wall 192, 262, 322, and for each of the side panel brackets 160, 162 and the rear bracket 166, bonding the upper section 218, 340 of the horizontal leg 220, 338 to the horizontal surface 194, 324 of the flange structure 152, and for the front bracket 164 bonding the lower section 292 of the horizontal leg 288 to the horizontal surface 264 of the flange structure 152.

While, for purposes of simplicity of explanation, the method has steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
a roof structure including a roof panel formed of aluminum or an aluminum-based alloy;
a vehicle body including a pair of laterally spaced side panels, a front roof rail and a rear roof rail, each roof rail spanning between the side panels, the vehicle body supporting the roof structure, the vehicle body formed of steel or a steel alloy;
at least one bracket securing the roof structure to the vehicle body, the bracket having a first portion fastened to the roof panel and a second portion extending away from the roof structure and welded to the vehicle body, the bracket formed of steel or a steel alloy; and
an adhesive located inward of the weld connection of the vehicle body and second portion of the bracket for bonding the second portion to the vehicle body, the adhesive sealing the fastened connection of the roof panel and first portion of the bracket from moisture to prevent galvanic corrosion between the dissimilar materials of the roof panel and bracket, the adhesive further reducing thermal distortion of the attached roof panel relative to the vehicle body when the vehicle assembly is heated in a paint bake oven during the manufacture of the vehicle assembly.

2. The vehicle assembly of claim 1, wherein the roof panel includes an upper horizontal surface connected to a flange structure provided at a peripheral edge portion of the upper horizontal surface, the flange structure being defined by a vertical wall and a lower horizontal surface, the bracket first portion being fastened to the vertical wall, the adhesive bonding the bracket second portion to the lower horizontal surface.

3. The vehicle assembly of claim 2, wherein the first portion of the bracket is a vertical leg and the second portion of the bracket is a horizontal leg, the vertical leg being connected to an interior of the roof panel vertical wall.

4. The vehicle assembly of claim 3, wherein the horizontal leg has a stepped configuration including an upper section and a lower section.

5. The vehicle assembly of claim 4, wherein the upper section of the horizontal leg is bonded to the lower horizontal surface of the roof panel, and the lower section extends outward beyond the lower horizontal surface and is welded to the vehicle body.

6. The vehicle assembly of claim 4, wherein the lower section of the horizontal leg is bonded to the lower horizontal surface of the roof panel, and the upper section extends outward beyond the lower horizontal surface and is welded to the vehicle body.

7. The vehicle assembly of claim 2, wherein the bracket includes a pair of side brackets for connecting the side panels to the roof panel flange structure, a front bracket for connecting the front roof rail to the roof panel flange structure and a rear bracket for connecting the rear roof rail to the roof panel flange structure, together the four brackets extending approximately an entire perimeter of the roof panel.

8. The vehicle assembly of claim 7, wherein the second portion of the front bracket is bonded to an end portion of a windshield.

9. The vehicle assembly of claim 1, wherein the bracket provides for a continuous vertical spacing between the roof panel and the vehicle body of approximately 4 mm to approximately 6 mm, the adhesive being provided in the spacing.

10. The vehicle assembly of claim 1, wherein each of the side panels, front roof rail and rear roof rail includes an outer panel and an inner panel, the bracket second portion being welded to the respective outer panel of each of the side panels, front roof rail and rear roof rail.

11. The vehicle assembly of claim 10, wherein the outer panel of each of the side panels, front roof rail and rear roof rail includes a flange structure having a horizontal wall, the bracket second portion being welded to the horizontal wall of each of the side panels, front roof rail and rear roof rail.

12. A vehicle assembly comprising:
a vehicle roof structure including a roof panel, the vehicle roof structure is formed of aluminum or an aluminum-based alloy;
a vehicle body including a pair of laterally spaced side panels and a front roof rail and a rear roof rail spanning between the side panels, the side panels together with the front and rear roof rails support the vehicle roof structure, the vehicle body is formed of steel or a steel alloy; and
a pair of side brackets connecting the side panels to roof panel, a front bracket connecting the front roof rail to the roof panel, and a rear bracket connecting the rear roof rail to the roof panel, each bracket having a first portion fastened to the roof panel and a second portion extending outwardly of the roof panel and welded to the vehicle body, each bracket formed of steel of a steel alloy;
wherein each of the brackets provides a continuous vertical spacing between the roof panel and the vehicle body of approximately 4 mm to approximately 6 mm, the vehicle roof structure is bonded to the vehicle body via an adhesive provided in the spacing, the adhesive sealing the fastened connection of the roof panel and first portion of the bracket from moisture to prevent galvanic corrosion between the dissimilar materials of the roof panel and bracket, the adhesive further reducing thermal distortion of the attached roof panel relative to the vehicle body when the vehicle assembly is heated in a paint bake oven during the manufacture of the vehicle assembly.

13. The vehicle assembly of claim 12, wherein the roof panel includes a flange structure provided at a peripheral edge portion, the flange structure being defined by a vertical wall and a horizontal surface, each bracket first portion being fastened to the vertical wall, the adhesive bonding each bracket second portion to the horizontal surface.

14. The vehicle assembly of claim 13, wherein each bracket is substantially L-shaped and the first portion of the bracket is a vertical leg and the second portion of the bracket is a horizontal leg, the vertical leg being connected to an interior of the roof panel vertical wall, the horizontal leg having a stepped configuration including an upper section and a lower section.

15. The vehicle assembly of claim 14, wherein for each of the side panel brackets and the rear bracket, the upper section of the horizontal leg is bonded to the horizontal surface of the flange structure, and for the front bracket the lower section of the horizontal leg is bonded to the horizontal surface of the flange structure.

16. The vehicle assembly of claim 13, wherein together the four brackets extend approximately an entire perimeter of the roof panel.

17. A method of assembling a vehicle comprising:
providing a vehicle body formed of steel or a steel alloy, the vehicle body includes a pair of laterally spaced side panels, a front roof rail and a rear roof rail, each roof rail spans between the side panels;
providing a vehicle roof structure formed of aluminum or an aluminum-based alloy, the vehicle roof structure includes a roof panel having a flange structure provided at a peripheral edge portion, the flange portion including a vertical wall and a horizontal surface;
applying an adhesive on the horizontal surface of the flange structure around an entire perimeter of the roof panel;
providing a pair of side brackets, a front bracket and a rear bracket, each bracket formed of steel or a steel alloy, and positioning each of the brackets on the flange structure such that the adhesive is between each bracket and the flange structure;
positioning the vehicle roof structure together with the brackets on the vehicle body;
fastening each of the brackets to the vertical wall of the flange structure;
welding the side brackets to the side panels, the front bracket to the front roof rail and the rear bracket to the rear roof rail; and
heating the vehicle body together with the vehicle roof structure and the brackets to a predetermined temperature to cure the adhesive.

18. The method of claim 17, further including providing a continuous vertical spacing between the roof panel and the vehicle body of approximately 4 mm to approximately 6 mm by use of the side brackets, front bracket and rear bracket, and providing the adhesive in the spacing.

19. The method of claim 17, further including positioning the fastened connection between the brackets and the flange structure inwardly of the adhesive, and positioning the welded connection between the brackets and the vehicle body outwardly of the adhesive.

20. The method of claim 17, wherein each bracket is substantially L-shaped and includes a vertical leg and a horizontal leg having a stepped configuration including an upper section and a lower section, and the method includes clinching the vertical leg of each bracket to an interior of the flange structure vertical wall, and for each of the side panel brackets and the rear bracket, bonding the upper section of the horizontal leg to the horizontal surface of the flange structure, and for the front bracket bonding the lower section of the horizontal leg to the horizontal surface of the flange structure.

* * * * *